United States Patent
Mattmueller et al.

(10) Patent No.: US 11,294,069 B2
(45) Date of Patent: Apr. 5, 2022

(54) METHOD AND DEVICE FOR ASCERTAINING A NAVIGATION POSITION OF A NAVIGATION SYSTEM FOR A MOTOR VEHICLE, AND NAVIGATION SYSTEM

(71) Applicant: Continental Automotive GmbH, Hannover (DE)

(72) Inventors: Karsten Mattmueller, Burglengenfeld (DE); Helmut Schmidt, Regensburg (DE)

(73) Assignee: Continental Automotive GmbH

( * ) Notice: Subject to any disclaimer, the term of this patent is extended or adjusted under 35 U.S.C. 154(b) by 175 days.

(21) Appl. No.: 16/469,734

(22) PCT Filed: Dec. 11, 2017

(86) PCT No.: PCT/EP2017/082177
§ 371 (c)(1),
(2) Date: Jun. 14, 2019

(87) PCT Pub. No.: WO2018/108787
PCT Pub. Date: Jun. 21, 2018

(65) Prior Publication Data
US 2020/0225362 A1    Jul. 16, 2020

(30) Foreign Application Priority Data
Dec. 16, 2016 (DE) .................... 10 2016 225 282.8

(51) Int. Cl.
*G01S 19/40* (2010.01)
*G01S 19/39* (2010.01)
(Continued)

(52) U.S. Cl.
CPC ............ *G01S 19/40* (2013.01); *G01S 19/396* (2019.08); *G01S 19/423* (2013.01); *G01S 19/426* (2013.01); *G01S 19/49* (2013.01)

(58) Field of Classification Search
CPC ...... G01S 19/40; G01S 19/396; G01S 19/423; G01S 19/426; G01S 19/49
(Continued)

(56) References Cited

U.S. PATENT DOCUMENTS 5,884,220 A * 3/1999 Farmer .................. G01S 19/41
  701/470
6,332,070 B1   12/2001 Bochmann et al.
(Continued)

FOREIGN PATENT DOCUMENTS

DE         19836966 A1    2/2000
DE    10 2014 215570 A1   2/2016
(Continued)

OTHER PUBLICATIONS

International Search Report and Written Opinion dated Mar. 16, 2018 from corresponding International Patent Application No. PCT/EP2017/082177.

*Primary Examiner* — Bo Fan

(57) ABSTRACT

The invention relates to a navigation system for a motor vehicle for ascertaining a navigation position, having: a plurality of receivers for receiving respective position data of a plurality of different navigation satellite systems, an inertial measuring unit for ascertaining an inertial position of the navigation system, a receiving unit for receiving correction data, an additional receiving unit for receiving certified position data, a device which is coupled to the plurality of receivers, the inertial measuring unit, the receiving unit, and the additional receiving unit so as to transmit signals, wherein the device is designed to ascertain the navigation position on the basis of the position data, the inertial position, the correction data, and the certified position data. The invention additionally relates to a method which can be carried out by the navigation device in particular.

1 Claim, 2 Drawing Sheets

(51) Int. Cl.
*G01S 19/42* (2010.01)
*G01S 19/49* (2010.01)

(58) Field of Classification Search
USPC .............................. 342/357.23, 357.58, 352
See application file for complete search history.

(56) References Cited

U.S. PATENT DOCUMENTS

| | | |
|---|---|---|
| 7,667,644 B2 | 2/2010 | Meyers et al. |
| 8,825,397 B2 | 9/2014 | Kasargod et al. |
| 2013/0043851 A1* | 2/2013 | Ishino .................... H02M 3/156 323/282 |
| 2016/0040994 A1 | 2/2016 | Bartels |
| 2017/0336517 A1 | 11/2017 | Petillon |

FOREIGN PATENT DOCUMENTS

| | | |
|---|---|---|
| EP | 2887097 A2 | 6/2015 |
| WO | 2013/043851 A1 | 3/2013 |
| WO | 2015/012934 A2 | 1/2015 |
| WO | 2016/092160 A1 | 6/2016 |

* cited by examiner

METHOD AND DEVICE FOR ASCERTAINING A NAVIGATION POSITION OF A NAVIGATION SYSTEM FOR A MOTOR VEHICLE, AND NAVIGATION SYSTEM

BACKGROUND

The invention relates to a method and a corresponding device for ascertaining a navigation position of a navigation system for a motor vehicle, which in particular allows what is known as high-precision positioning with a precision of less than 3 m. The invention also relates to a navigation system for a motor vehicle which allows a precision of less than 3 m when ascertaining the position.

Several global navigation satellite systems (GNSS) are known, for example the Global Positioning System (GPS), GLONASS, BeiDou, and Galileo. In future, further systems of this type can be provided, which are used for positioning and navigation by receiving signals from navigation satellites and associated ground stations. In particular in motor vehicles, the navigation satellite systems are used to ascertain the position of the motor vehicle and, with the aid of a navigation system, to ascertain a route to a specified destination. A precision of 3 m or more when positioning can usually be achieved by means of a navigation satellite system.

It is desirable to specify a method for ascertaining a navigation position which reliably allows a high degree of precision. It is also desirable to specify a device which is designed to carry out the method. It is furthermore desirable to specify a navigation system which reliably has a high degree of precision.

BRIEF SUMMARY

The invention is characterized according to aspects by a method and a corresponding device for ascertaining a navigation position of a navigation system for a motor vehicle.

According to one embodiment, respective position data of a plurality of different navigation satellite systems are received. In particular, position data are received from all the available navigation satellite systems, that is, GPS, Galileo, GLONASS, and BeiDou. A respective position of the navigation system is ascertained on the basis of the position data. A deviation of the respective positions from one other is ascertained. The navigation position is ascertained on the basis of the respective positions if the deviation is less than a predefined threshold for the deviation; for example, the deviation should be less than 5%. The navigation position is in particular the value which is used by the navigation system for further subsequent calculations, for example for navigation and/or positioning.

An inertial position of the navigation system is ascertained by means of an inertial measuring unit. A second deviation between the inertial position and at least one of the positions ascertained on the basis of the position data is ascertained. The navigation position is ascertained on the basis of the at least one position if the second deviation is less than a predefined threshold for the second deviation; for example, the deviation should be less than 5%. The inertial measuring unit is in particular a measuring unit which is independent of navigation satellite systems.

Respective correction data for the plurality of navigation satellite systems are received. The navigation position is ascertained on the basis of the received correction data. The correction data are in particular provided by data providers. Certified position data are received from one of the navigation satellite systems. A certified position of the navigation system is ascertained on the basis of the certified position data. The navigation position is ascertained on the basis of the certified position. For example, the certified position data are received by means of a Public Regulated Service (PRS). The certified position data are in particular encrypted and have a high degree of precision and reliability.

Owing to the plurality of different plausibility-checking steps, a high-precision navigation position can be ascertained, which also corresponds to the actual position of the navigation device with a high degree of statistical probability. A high-precision position is a position with a precision of at most 3 m, in particular less than 1 m, for example a precision of 30 cm or less. With conventional receivers for global navigation satellite systems, it is possible to ascertain such high-precision positions. However, these positions are not assured and are not reliable enough to be used for a motor vehicle. By means of the method according to the application, it is possible to assure the ascertained positions and use them for ascertaining the navigation position only if the ascertained positions are validated correspondingly.

In addition, it is possible to forward an item of information to the effect that an ascertained position is at least currently not reliable if a corresponding validation is not possible.

The combination of different monitoring mechanisms to validate the ascertained position allows a high degree of reliability when ascertaining the navigation position. The different levels of the contribution to determining the high-precision navigation position are assigned to different monitoring methods. Sufficiently good system security is thus provided, so that the high-precision navigation positions can be reliably used further. For example, it is thus also possible to use the navigation position for automated driving in addition to conventional navigation applications. For example, lane detection for the motor vehicle is possible by means of the high-precision navigation position.

By means of the method according to the application, it is possible to check the reliability of the ascertained positions and to determine whether the ascertained positions are usable or not. The high-precision navigation position is also possible with a sufficiently high degree of precision in particular if the reception from the satellites is bad, for example in built-up or wooded areas or if there is other interference, for example caused by the ionosphere.

One monitoring method includes ascertaining the position of the navigation system on the basis of the different available global navigation satellite systems. An individual position is ascertained by means of each navigation satellite system. All the possible pairings are compared, and the respective deviations in the ascertained positions are ascertained. All the deviations are then checked as to whether they fall below the predefined threshold for the deviation. If this is the case, all the navigation satellite systems used function normally, and the respective ascertained positions are used to ascertain the navigation position.

A further method is checking the plausibility of the movement by means of the inertial measuring unit. By means of the inertial measuring unit, an expected window for the next position to be ascertained is ascertained. The expected window is specified in particular around the inertial position. For example, the expected window is ascertained by means of already known methods of dead reckoning, which, however, is not used here to calculate a position if the satellite navigation fails, but to determine in advance a region within which the next ascertained position should lie. If the ascertained position lies within the expected window, the ascertained position is validated and used for ascertaining the navigation position.

A further method is the use of correction data. The correction data are received from a correction service. The correction service provides information about the status of each individual satellite of the navigation satellite systems. In particular, this includes corrections for the clocks situated in the satellites and/or corrections for the orbit data of the respective satellites. In particular, multiple correction services are used both to increase the reliability of the correction data and to validate the correction data of another correction service in each case.

A further method is alignment by means of a certified position. The certified position data are for example provided by means of a data provider with the aid of the PRS band of the Galileo navigation satellite system. The certified position data have a higher degree of precision than the normal position data. For example, the certified position is ascertained for certain operating states, for example when the system is started and subsequently at variable points in time, in order to be able to use the certified position guaranteed by the public services as an absolutely precise reference. For example, it is thereby possible to compensate common sensor drift. In addition, navigation satellite system receivers can each be individually checked cyclically and independently with a standard precision. This check is carried out for example at intervals of several minutes. It is thus possible to ensure that the ascertained position lies within a predefined deviation from the certified position.

According to further embodiments, it is ascertained when checking the integrity of the individual navigation satellite systems whether one of the navigation satellite systems is always involved if a deviation between in each case two positions is greater than the predefined threshold for the deviation. If this is the case, it can be assumed that this navigation satellite system is defective. Consequently, the position data of this navigation satellite system are not used to ascertain the navigation position. Alternatively or additionally, an ascertained navigation position is invalidated if the navigation position was ascertained on the basis of the position data which were received from the defective navigation satellite system.

Alternatively or additionally, it is possible to invalidate the ascertained navigation position if the second deviation ascertained by means of the inertial position is greater than the threshold for the second deviation. Alternatively or additionally, the navigation position is ascertained without the position data of the navigation satellite system, the position data of which have resulted in the ascertained position which lies outside the expected window around the inertial position.

If multiple inertial measuring units are used, the expected window is determined for each possible combination. The reliability can thus be increased further.

According to a further embodiment of the invention, a navigation system for a motor vehicle for ascertaining a navigation position has a plurality of receivers for receiving respective position data of a plurality of different navigation satellite systems. An inertial measuring unit is provided for ascertaining an inertial position of the navigation system. The navigation system has at least one receiving unit for receiving correction data. The navigation system has an additional receiving unit for receiving certified position data. The navigation system has a device which is coupled to the plurality of receivers, the inertial measuring unit, the receiving unit, and the additional receiving unit so as to transmit signals. The device is designed to ascertain the navigation position on the basis of the position data, the inertial position, the correction data, and the certified position data. In particular, the device is designed to carry out the method according to the application.

For example, the navigation device is designed to carry out a method according to the application. In addition, the method according to the application can be carried out in particular by the navigation device. The described advantages and features of the method also apply correspondingly to the navigation system, and vice versa.

Further advantages, features and developments can be found in the examples below, explained in conjunction with FIGS. 1 and 2.

DETAILED DESCRIPTION

Figure 1:
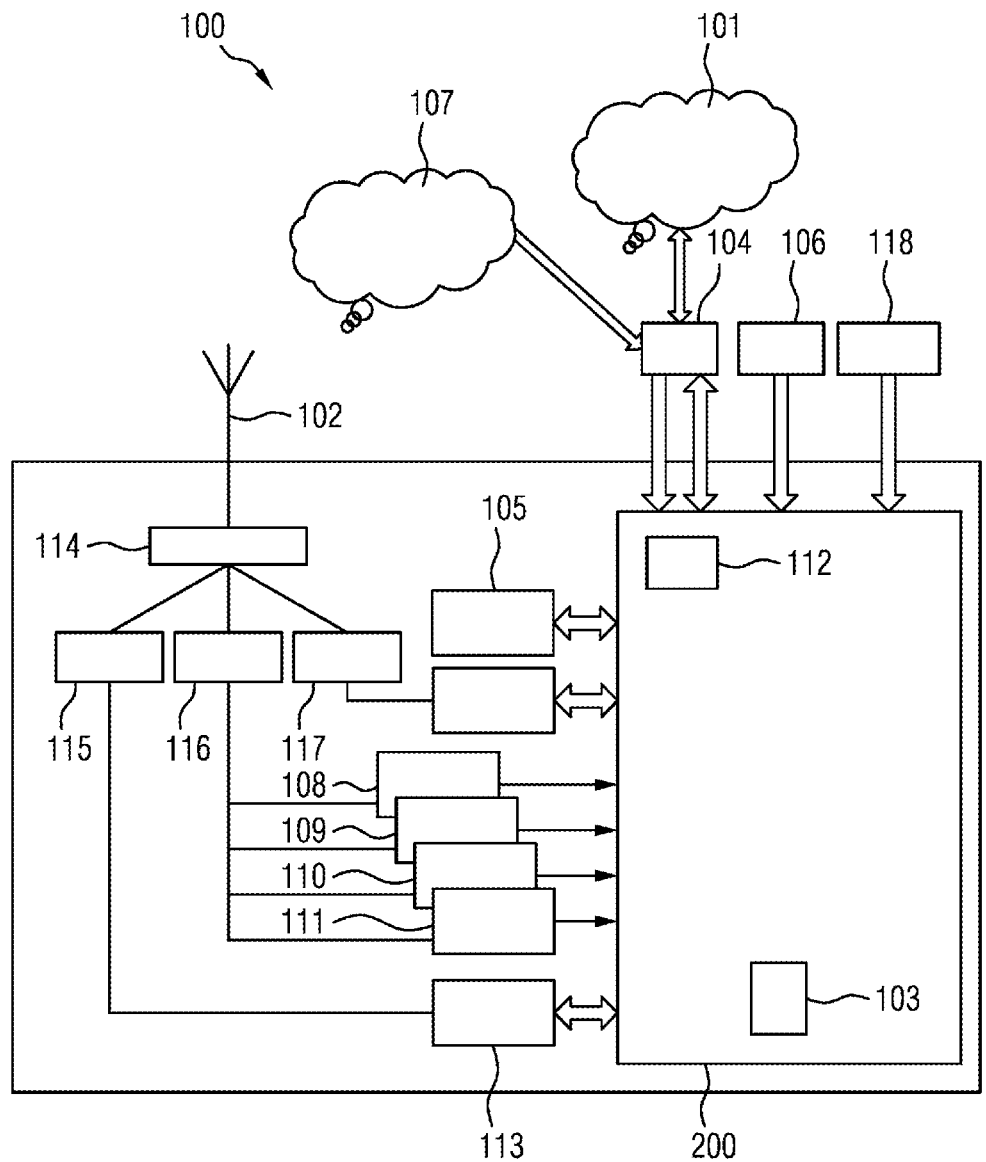
FIG. 1 shows a schematic diagram of a navigation system according to one embodiment.

FIG. 1 shows a navigation system 100, in particular the navigation system 100 of a motor vehicle. A navigation position ascertained by means of the navigation system 100 is used in particular for the navigation of the motor vehicle and for automated driving of the motor vehicle. In particular, the navigation position which has been ascertained by means of the navigation system 100 is so precise that the motor vehicle can be assigned to a lane of the roadway. The precision is in particular at least 1 m and in particular better than 30 cm.

An antenna 102 is provided for receiving the position data of a plurality of different navigation satellite systems. In particular, the antenna 102 is designed to receive position data of the known navigation satellite systems GPS, Galileo, GLONASS, and BeiDou. A splitter 114, in particular a GNSS splitter, is arranged downstream of the antenna 102. Filters 115, 116 and 117 are provided subsequently. The filter 115 is for example an L1/B2/E5 filter, which filters the corresponding frequencies. The filter 116 is for example an L1/B1 filter. The filter 117 is for example a multi-constellation filter.

A receiver 108 to 111 is provided for each navigation satellite system. For example, the receiver 108 is a GPS receiver, the receiver 109 is a GLONASS receiver, the receiver 110 is a Galileo receiver, and the receiver 111 is a BeiDou receiver.

The navigation system 100 has a high-precision inertial measuring unit 105 with six degrees of freedom. Further inertial measuring units 106 can be provided, which are also used in conventional motor vehicles. For example, information from an information unit 118 is also used to ascertain the navigation position, said information including, for example, information about the speed of the motor vehicle and/or other information which can be used to ascertain the navigation position and check the plausibility of same.

A telematic control unit 104 is provided, which can receive data from data providers 101 and 107. The data provider 101 provides certified position data, for example. The data provider 107 provides correction data for the respective navigation satellite systems, for example.

The navigation system 100 has a device 200 with a processor 103. The device 100 is designed to process data of the different elements of the navigation system and further input variables and to ascertain the navigation position. The device 200 has different hardware and software modules. Different functions of the navigation system according to the application can be implemented in hardware and/or software of the device 200. For example, a receiving unit 112 is implemented as software in the device 200, which further processes the correction data and certified position data of the data providers 101 and 107.

The navigation system has a further receiving unit 113, which can likewise receive and further process certified position data directly from the navigation satellite system, in particular from Galileo.

Figure 2:
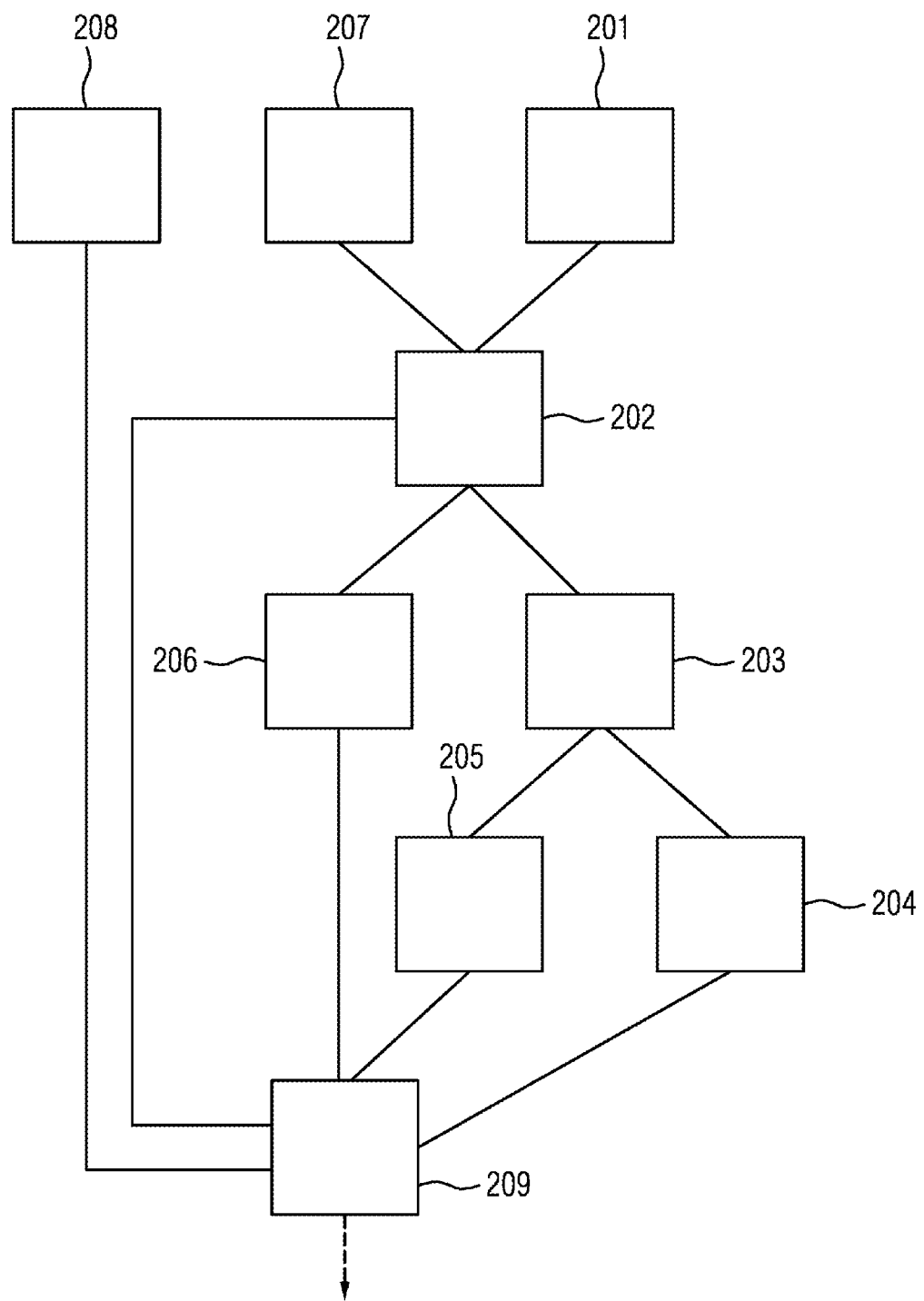
FIG. 2 shows a schematic diagram of a method according to one embodiment.

The operation of the navigation system 100 is explained below in conjunction with the flow chart of FIG. 2.

In step 201, position data are received from each of the available navigation satellite systems. In particular, high-precision position data are received by means of the receiver 108 to 111.

In a step 202, the device 200 ascertains a respective position by means of the received position data. An individual position for the navigation system is thus ascertained by means of each available navigation satellite system.

In step 203, all the possible pairings of the ascertained positions are compared, and the respective deviations within the pairings are determined. If it is ascertained in the process that the position which by means of position data of a particular navigation satellite system is ascertained always deviates from the other positions by more than a predefined threshold, an error in the positioning by means of this particular navigation satellite system is assumed.

The device 200 then ascertains, in step 204, the navigation position on the basis of the other ascertained positions and independently of the ascertained position of the particular navigation satellite system. For example, an average of the ascertained positions is determined and ascertained as the navigation position for further use.

In step 205, it is ascertained whether a navigation position on the basis of an ascertained position of the particular navigation satellite system has already been used. If this is the case, this navigation position is invalidated. The device 200 thus ascertains a high-precision navigation position with the additional information as to whether this high-precision navigation position is reliable enough to be used further.

In addition, the positions ascertained in step 202 are, in a step 206, plausibility-checked using the values of the inertial measuring unit 105 and also, if necessary, of the second inertial measuring units 106. If ascertained positions deviate from the inertial positions which were ascertained by means of the inertial measuring unit 105 by more than a predefined threshold, said ascertained positions are not used further to ascertain the navigation position. Alternatively or additionally, a check is made as to whether a navigation position has already been ascertained on the basis of this ascertained position. If this is the case, this navigation position is invalidated. It is thus possible to plausibility-check and validate the navigation position ascertained by the device 200 also by means of a system which is independent of satellites.

Furthermore, in a step 207, correction data of a plurality of different correction services 107 are received and included in the calculation of the navigation position and the individual ascertained positions of the navigation satellite systems. It is thus possible to ascertain a more precise navigation position and also a more reliable navigation position. In addition, it is possible to validate the individual data sets of the correction data of the different correction services against one another. If the validity of a resulting data set cannot be determined, a navigation position which was ascertained using this data set which could not be finally checked, is invalidated.

In a further step 208, the certified position data of the PRS band (E5) of the Galileo navigation satellite system are used. In particular, the data are used directly by means of the further receiving unit 113 and via one or more of the data providers 101. The check of the ascertained navigation position with the certified position takes place in particular not for each ascertained navigation position but at regular or irregular intervals of several minutes, for example. In particular on starting, a reliable reference position is thus ascertained, for which it is ensured that it lies within a predefined boundary and the actual position.

In a step 209, the high-precision and reliable navigation position is ascertained from all the variables which were ascertained by means of steps 201 to 208 and is then forwarded to other systems of the motor vehicle, for example to calculate a route or to control automated driving.

The device 200 is thus designed to ascertain the navigation position with a precision of less than 1 m around the actual position. To this end, the high-precision inertial measuring unit 105 and the high-precision navigation satellite systems and the correction services are used.

In addition, the device 200 is designed to check the integrity of the ascertained navigation position. To this end, for example, information from the electronic stability program and the further inertial measuring units 106 is used to ascertain an expected corridor for the position ascertained by means of the satellite data. Furthermore, positions are ascertained independently of one another by means of different navigation satellite systems so that errors in individual navigation satellite systems are apparent and can be omitted if necessary.

Furthermore, the device 200 is designed to align the ascertained navigation position with certified positions and thus ascertain absolute references.

Overall, the ascertainment of a high-precision navigation position is thus implemented with a level of monitoring high enough for the ascertained navigation position to lie within a predefined deviation of for example less than 1 m around the actual position.

The invention claimed is:

1. A device for a motor vehicle, said device being designed to carry out operations for ascertaining a navigation position of a navigation system for a motor vehicle, the operations comprising:
    receiving respective position data of a plurality of different navigation satellite systems,
    ascertaining a respective position of the navigation system based on the position data,
    ascertaining a deviation of the respective positions from one another,
    ascertaining the navigation position based on the respective positions if the deviation is less than a predefined threshold for the deviation,
    ascertaining an inertial position of the navigation system by means of an inertial measuring unit,
    ascertaining a second deviation of at least one of the positions ascertained based on the position data from the inertial position,
    ascertaining the navigation position based on the at least one position if the second deviation is less than a predefined threshold for the second deviation,
    receiving respective correction data for the plurality of navigation satellite systems, ascertaining the navigation position based on the received correction data,
receiving certified position data of one of the navigation satellite systems,
ascertaining a certified position of the navigation system based on the certified position data,
ascertaining the navigation position based on the certified position,
ascertaining respective deviations from in each case two positions of the respective positions,
if the respective deviation is greater than the predefined threshold for the deviation:
ascertaining the respective two navigation satellite systems from which the two position data were received from which the two positions were each ascertained,
if a first navigation satellite system of the navigation satellite systems is always one of the two navigation satellite systems,
ascertaining the navigation position independently of the position data which are received from the first navigation satellite system,
invalidating the navigation position if the navigation position was ascertained based on the position data which were received from the first navigation satellite system,
wherein ascertaining the inertial position comprises:
ascertaining a course of inertial positions by means of the inertial measuring unit,
if the second deviation is greater than the threshold for the second deviation,
ascertaining the navigation position independently of the position data from which the at least one position was ascertained,
invalidating the navigation position if the navigation position was ascertained based on the position data from which the at least one position was ascertained,
ascertaining a plurality of inertial positions of the navigation system by means of a plurality of inertial measuring units,
ascertaining a plurality of second deviations of in each case at least one of the positions ascertained based on the position data for the respective inertial positions of the plurality of inertial positions,
ascertaining the navigation position based on the at least one position if the second deviation is in each case less than the predefined threshold for the second deviation,
receiving respective correction data from at least a first and a second data provider, which are different from each other,
comparing the correction data of the first data provider with the correction data of the second data provider,
if the correction data deviate from one another by more than a predefined tolerance:
invalidating the navigation position if the navigation position was ascertained based on the correction data which were received from the first and/or the second data provider, and/or
ascertaining the navigation position independently of the correction data from the first and/or the second data provider.

* * * * *